(12) United States Patent
Koo

(10) Patent No.: US 9,346,443 B2
(45) Date of Patent: May 24, 2016

(54) ELECTRONIC HYDRAULIC BRAKE SYSTEM

(71) Applicant: HYUNDAI MOBIS CO., LTD., Seoul (KR)

(72) Inventor: Chang Hoe Koo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/484,116

(22) Filed: Sep. 11, 2014

(65) Prior Publication Data
US 2015/0137588 A1 May 21, 2015

(30) Foreign Application Priority Data

Nov. 21, 2013 (KR) ........................ 10-2013-0142508

(51) Int. Cl.
| | |
|---|---|
| *B60T 11/20* | (2006.01) |
| *B60T 13/14* | (2006.01) |
| *B60T 13/66* | (2006.01) |
| *B60T 13/68* | (2006.01) |
| *B60T 13/74* | (2006.01) |
| *B60T 8/40* | (2006.01) |

(52) U.S. Cl.
CPC ............... *B60T 11/20* (2013.01); *B60T 8/4081* (2013.01); *B60T 13/146* (2013.01); *B60T 13/662* (2013.01); *B60T 13/686* (2013.01); *B60T 13/745* (2013.01)

(58) Field of Classification Search
CPC ..... B60T 11/20; B60T 13/146; B60T 13/745; B60T 13/686; B60T 13/662; B60T 11/28; B60T 11/228
USPC .................. 303/14, 3, 6.01, 115.2, 186, 187
See application file for complete search history.

(56) References Cited

U.S. PATENT DOCUMENTS

| | | | | |
|---|---|---|---|---|
| 5,281,012 | A * | 1/1994 | Binder ................. | B60T 8/268 303/113.5 |
| 8,226,176 | B2 * | 7/2012 | Hatano ................ | B60T 8/4081 303/115.2 |
| 8,827,377 | B2 * | 9/2014 | Nishioka .............. | B60T 7/042 303/10 |
| 9,108,611 | B2 * | 8/2015 | Yang .................... | B60T 7/042 |
| 2011/0285200 | A1 * | 11/2011 | Hatano ................ | B60L 7/24 303/6.01 |
| 2012/0161506 | A1 * | 6/2012 | Tanaka ................ | B60T 13/745 303/14 |
| 2012/0306260 | A1 * | 12/2012 | Ohkubo ............... | B60T 7/042 303/14 |
| 2013/0134768 | A1 * | 5/2013 | Ito ....................... | B60L 3/0092 303/3 |
| 2013/0214587 | A1 * | 8/2013 | Yang .................... | B60T 13/686 303/6.01 |
| 2013/0270895 | A1 * | 10/2013 | Nishioka .............. | B60T 7/042 303/14 |
| 2014/0203626 | A1 * | 7/2014 | Biller ................... | B60T 8/4081 303/10 |
| 2014/0354036 | A1 * | 12/2014 | Koo ..................... | B60T 13/686 303/6.01 |

FOREIGN PATENT DOCUMENTS

KR 10-2007-0104982 A 10/2007

\* cited by examiner

*Primary Examiner* — Thomas J Williams
*Assistant Examiner* — Mariano Sy
(74) *Attorney, Agent, or Firm* — Knobbe Martens Olson & Bear LLP

(57) ABSTRACT

An electronic hydraulic brake system may include: a main master cylinder driven by a motor in response to control of an electronic control unit (ECU), and supplying oil pressure to wheel cylinders; and a backup master cylinder forming a reaction force on a brake pedal in response to pressure of the brake pedal. When power of the ECU is cut off, the backup master cylinder may supply oil pressure to the main master cylinder.

5 Claims, 3 Drawing Sheets

ELECTRONIC HYDRAULIC BRAKE SYSTEM

CROSS-REFERENCES TO RELATED APPLICATIONS

The present application claims priority to Korean application number 10-2013-0142508, filed on Nov. 21, 2013, which is incorporated by reference in its entirety.

BACKGROUND

The present disclosure relates to an electronic hydraulic brake system, and more particularly, to an electronic hydraulic brake system which is capable of transferring oil pressure to a main master cylinder even though no power is applied to an electronic control unit (ECU), and performing manual bleeding even in a state where power is cut off for an after service of a vehicle.

In general, an electronic hydraulic brake system senses a pedal pressure of a driver through a sensor, and then adjusts a brake pressure of each wheel using a hydraulic modulator, in response to the pedal pressure of the driver.

The related art is disclosed in Korean Patent Laid-open Publication No. 10-2007-0104982 published on Oct. 30, 2007 and entitled "Control apparatus for valve in electro-hydraulic brake system".

SUMMARY

Embodiments of the present invention are directed to an electronic hydraulic brake system which not only connects a backup master cylinder connected to a brake pedal to a main master cylinder driven by a motor through normal open valves, but also connects the main master cylinder to a wheel brake unit through normal open valves, thereby performing manual bleeding even when no power is applied to an electronic control unit (ECU).

In one embodiment, an electronic hydraulic brake system may include: a main master cylinder driven by a motor in response to control of an electronic control unit (ECU), and supplying oil pressure to wheel cylinders; and a backup master cylinder forming a reaction force on a brake pedal in response to pressure of the brake pedal. When power of the ECU is cut off, the backup master cylinder may supply oil pressure to the main master cylinder.

The electronic hydraulic brake system may further include: a first valve for adjusting oil pressure between a first chamber of the backup master cylinder and a third chamber of the main master cylinder; a second valve for adjusting oil pressure between a second chamber of the backup master cylinder and a fourth chamber of the main master cylinder; a third valve for adjusting oil pressure transferred to a wheel cylinder from the third chamber of the main master cylinder; and a fourth valve for adjusting oil pressure transferred to a wheel cylinder from the fourth chamber of the main valves.

The first and second valves may be closed when power is supplied to the ECU, and opened when the power of the ECU is cut off.

When a brake of a vehicle is controlled by the ECU, both of the first and second valves may be closed to block a flow path between the backup master cylinder and the main master cylinder, and the wheel cylinders may be opened/closed only by the oil pressure supplied from the main master cylinder controlled by the ECU.

The third and fourth valves may be opened when oil is supplied to the main master cylinder by the backup master cylinder.

The electronic hydraulic brake system may further include: a first flow path unit for transferring oil pressure to first and second wheel cylinders which brake two wheels, respectively, in response to the oil pressure adjusted by the third valve; and a second flow path unit for transferring oil pressure to third and fourth wheel cylinders which brake two other wheels, respectively, in response to the oil pressure adjusted by the fourth valve.

The first wheel cylinder may brake the left front wheel and the second wheel cylinder brakes the right rear wheel, and the third wheel cylinder may brake the left rear wheel and the fourth wheel cylinder brakes the right front wheel.

The first wheel cylinder may brake the left rear wheel and the second wheel cylinder brakes the right rear wheel, and the third wheel cylinder may brake the left front wheel and the fourth wheel cylinder brakes the right front wheel.

The first and second flow path units may include separate inlet and outlet valves for each of the wheel cylinders which transfer oil pressure.

When the brake of the vehicle is controlled by the ECU, the oil pressure supplied by the main master cylinder is adjusted through a motor controlled by the ECU, the oil pressure of the third chamber of the main master cylinder may be supplied to the first flow path unit through the third valve, and the oil pressure of the fourth chamber may be supplied to the second flow path unit through the fourth valve.

In accordance with the embodiment of the present invention, the backup master cylinder connected to the brake pedal and the main master cylinder driven by the motor may be connected through the normal open valves, and the main master cylinder and the wheel brake may be connected through the normal open valves. Thus, although no power is applied to the ECU, the pedal pressure may be transferred to the main master cylinder. Thus, a manual bleeding operation may be performed even in a state where power is cut off for an after service of the vehicle, and the number and size of parts may be decreased to reduce the weight and manufacturing cost of the vehicle.

DESCRIPTION OF SPECIFIC EMBODIMENTS

An electronic hydraulic brake system in accordance with an embodiment of the invention will hereinafter be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

An electronic hydraulic brake system includes a sensor and a pedal simulator. The sensor serves to sense a stroke distance of the pedal such that the driver can perceive a desired brake pressure, and the pedal simulator serves to make the drive feel the same pedal pressure as in a general hydraulic brake system.

Thus, when the driver steps on a brake pedal, a valve installed between a master cylinder and a wheel cylinder is closed to separate hydraulic lines of the master cylinder and the wheel cylinder.

At this time, the electronic hydraulic brake system calculates a brake pressure desired by the driver based on the stroke distance of the pedal, sensed through the sensor. As a pump and inlet and outlet valves for each wheel cylinder are controlled in response to the brake pressure, oil pressure previously stored in a reserve unit is supplied to each wheel cylinder so as to obtain a desired brake pressure.

When the pressure of each wheel cylinder needs to be independently controlled, a balance value is selectively opened/closed to adjust the pressure between the left and right wheels.

Based on the stroke distance of the brake pedal, the electronic hydraulic brake system drives a motor to provide pressure to the master cylinder according to control of an electronic control unit (ECU), and supplies oil pressure to the wheel cylinders.

However, when power of a vehicle is cut off for an after service of the vehicle, the ECU and the motor are not driven. Thus, oil is not supplied to the master cylinder, and the master cylinder is not driven. In this case, a value for supplying oil pressure to an actuator cannot be opened. Therefore, a separate device is required to perform a bleeding operation of removing air from the actuator.

Figure 1:
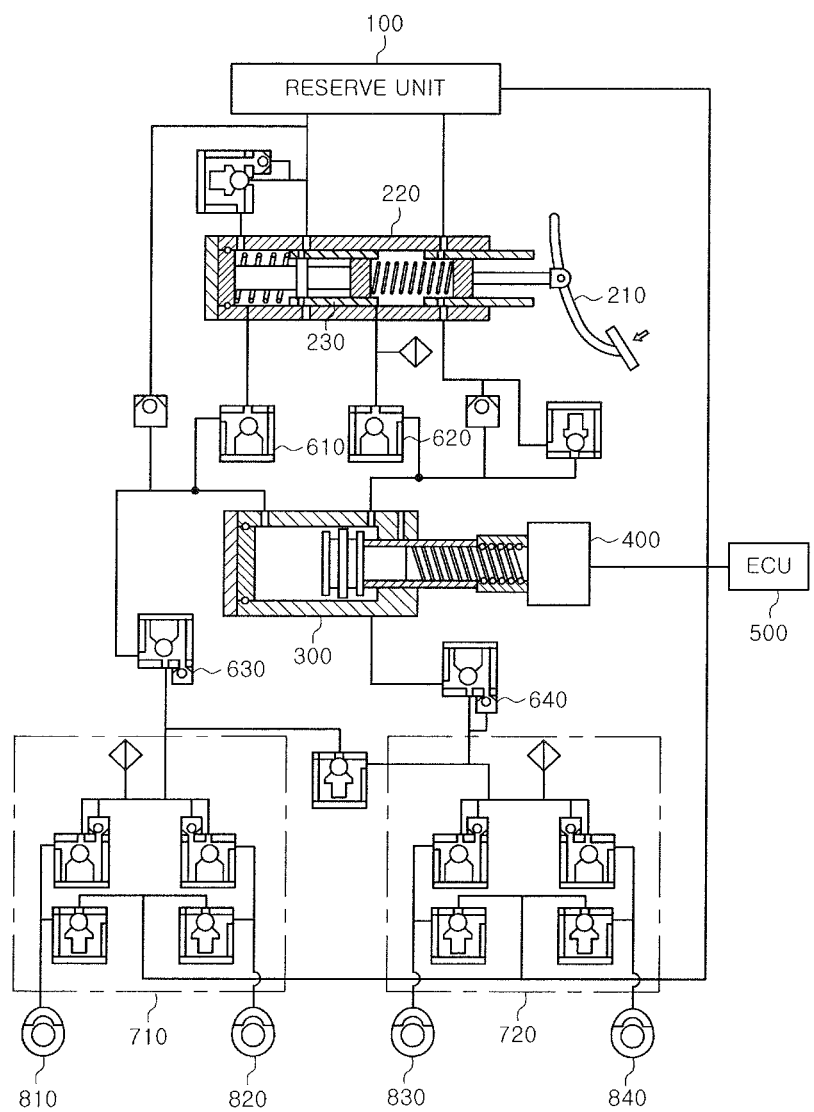
FIG. 1 is a diagram schematically illustrating an electronic hydraulic brake system in accordance with an embodiment of the present invention.

FIG. 1 is a diagram schematically illustrating an electronic hydraulic brake system in accordance with an embodiment of the present invention.

As illustrated in FIG. 1, the electronic hydraulic brake system in accordance with the embodiment of the present invention may include a main master cylinder 300, a backup master cylinder 220, a first valve 610, a second valve 620, a third valve 630, a fourth valve 640, a first flow path unit 710, and a second flow path unit 720.

The backup master cylinder 220 may supply oil from a reserve unit 100 to the main master cylinder 300 in response to pressure of a brake pedal 210.

The backup master cylinder 220 may include a pedal simulator piston 230 therein.

In the electronic brake system, when a driver steps on the brake pedal 210, pressure generated in the backup master cylinder 220 may be transferred to the pedal simulator piston 230 to transfer a reaction feeling to the driver.

The inside of the backup master cylinder 220 may be divided into a first chamber from the pedal simulator piston 230 to the inside of the backup master cylinder and a second chamber from the pedal simulator piston 230 and the brake pedal 210.

The main master cylinder 300 may be driven by the motor 400 and supply oil pressure to wheel cylinders 810 to 840, in response to control of an electronic control unit (ECU) 500.

When the driver steps on the brake pedal 210, a stroke distance of the brake pedal 210 may be sensed and transferred to the ECU 500, and the ECU 500 may control the motor 400 based on the stroke distance of the brake pedal 210, thereby controlling the oil pressure supplied by the main master cylinder 300.

The inside of the main master cylinder 300 may be divided into a third chamber and a fourth chamber. The third chamber may correspond to the inside of the cylinder, that is, the left side in FIG. 1 when the piston connected to the motor 400 is set to the boundary therebetween, and the fourth chamber may correspond to the outside of the cylinder, that is, the right side in FIG. 1 when the piston is set to the boundary therebetween.

The first valve 610 may adjust oil pressure between the first chamber of the backup master cylinder 220 and the third chamber of the main master cylinder 300. Furthermore, the second valve 620 may adjust oil pressure between the second chamber of the backup master cylinder 220 and the fourth chamber of the main master cylinder 300.

The first and second valves 610 and 620 may include normal open valves. The normal open valve may indicate a valve which is opened in a state where no input is applied from outside. Thus, when no control signal is applied from outside, that is, when power of the vehicle is cut off, the first and second valves 610 and 620 may be opened to form a flow path of oil.

As described above, when the brake of the vehicle is controlled by the ECU 500, the first and second valves 610 and 620 may be closed to block a flow path between the backup master cylinder 220 and the main master cylinder 300. In this case, the wheel cylinders 810 to 840 may be opened and closed only by oil pressure supplied from the main master cylinder 300, and the braking forces of the vehicle wheels may also be controlled by the ECU 500 and the main master cylinder 300.

However, when no power is supplied to the electronic hydraulic brake system including the ECU 500, the first and second valves 610 and 620 may be opened to form a flow path of oil, because the first and second valves 610 and 620 are normal open valves. Thus, when a user steps on the brake pedal 210 in a state where no power is supplied, oil pressure formed in the first chamber through oil supplied from the reserve unit 100 may be supplied to the third chamber through the first valve 610, and oil pressure formed in the second chamber through oil supplied from the reserve unit 100 may be supplied to the fourth chamber through the second valve 620.

That is, when power of the ECU 500 is cut off, the backup master cylinder 220 may supply oil from the reserve unit 100 to the main master cylinder 300.

Thus, since the oil pressure is supplied to the main master cylinder 300 even when no power is supplied to the ECU 500, a manual bleeding operation of removing air from the main master cylinder 300 may be performed without a separate device.

The third valve 630 may adjust oil pressure transferred from the third chamber of the main master cylinder to a wheel cylinder. Furthermore, the fourth valve 640 may adjust oil pressure transferred from the fourth chamber of the main master cylinder to a wheel cylinder.

The third and fourth valves 630 and 640 may include normal open valves. That is, the third and fourth valves 630 and 640 may be opened to form a flow path of oil in a state where no input is applied from outside.

The first flow path unit 710 may transfer oil pressure to the first wheel cylinder 810 for braking the left front wheel and the second wheel cylinder 820 for braking the right rear wheel, in response to the oil pressure adjusted through the third valve. Furthermore, the second flow path unit 720 may transfer oil pressure to the third wheel cylinder 830 for braking the left rear wheel and the fourth wheel cylinder 840 for braking the right front wheel, in response to the oil pressure adjusted through the fourth valve. In the present embodiment, it has been described that the first wheel cylinder 810 brakes the left front wheel, the second wheel cylinder 820 brakes the right rear wheel, the third wheel cylinder 830 brakes the left rear wheel, and the fourth wheel cylinder 840 brakes the right front wheel. Depending on embodiments, however, a different structure may be applied. That is, the first wheel cylinder 810 may brake the left rear wheel, the second wheel cylinder 820 may brake the right rear wheel, the third wheel cylinder 830 may brake the left front wheel, and the fourth wheel cylinder 840 may brake the right front wheel.

In this case, each of the first and second flow path units may include separate inlet and outlet valves for each of the wheel cylinders which transfer oil pressure.

When the brake of the vehicle is controlled by the ECU 500, the oil pressure supplied from the main master cylinder 300 may be adjusted through the motor 400 controlled by the ECU 500. At this time, the oil pressure of the third chamber of the main master cylinder 300 may be supplied to the first flow path unit 710 through the third valve 630, and the oil pressure of the fourth chamber may be supplied to the second flow path unit 720 through the fourth valve 640.

When no power is supplied to the ECU 500, oil supplied from the reserve unit 100 through the backup master cylinder 220 may be transferred to the main master cylinder 300 and the third and fourth valves 630 and 640 through the first and second valves 610 and 620. Furthermore, since the third and fourth valves 630 and 640 are normal open valves, the third and fourth valves 630 and 640 may be opened to form a flow path of oil.

Thus, although no power is supplied to the ECU 500, the oil supplied from the reserve unit 100 may be supplied to the wheel cylinders 810 to 840. Thus, the driver may step on the brake pedal 210 to brake the wheels of the vehicle.

Furthermore, although the valve between the first and second flow path units 710 and 720 is closed so that oil pressure is not transferred between the first and second flow path units 710 and 720, both of the flow path units 710 and 720 may be connected to the reserve unit 100 through the first to fourth valves 610 to 640. Thus, although the brake is continuously operated in a state where no power is supplied to the ECU 500, no residual pressure occurs in any one of the flow path units.

Figure 2:
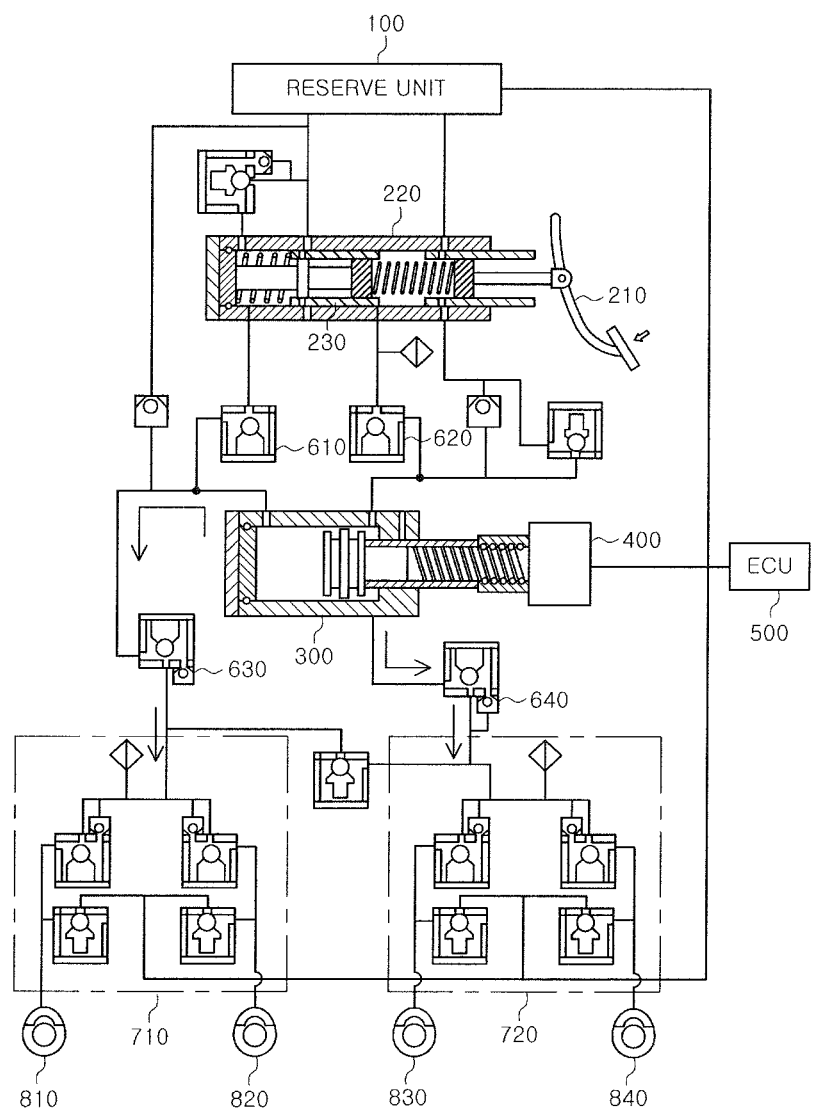
FIG. 2 is a diagram schematically illustrating a flow of oil pressure when power is supplied to an ECU in the electronic hydraulic brake system in accordance with the embodiment of the present invention.

FIG. 2 is a diagram schematically illustrating a flow of oil pressure when power is supplied to the ECU 500 in the electronic hydraulic brake system in accordance with the embodiment of the present invention.

When power is supplied to the ECU 500, the operation of the electronic hydraulic brake system in accordance with the embodiment of the present invention will be described with reference to FIG. 2.

When power is supplied to the ECU 500, the first and second valves 610 and 620 which are normal open valves may be closed.

Thus, the flow path between the backup master cylinder 220 and the main master cylinder 300 may be blocked, and the main master cylinder 300 may supply oil pressure to the first and second flow path units 710 and 720 and the wheel cylinders 810 to 840 using the power of the motor 400, only through the control of the ECU 500.

At this time, when the driver steps on the brake pedal 210, the stroke distance of the brake pedal 210 may be sensed and transferred to the ECU 500. The ECU 500 may control the motor 400 based on the stroke distance of the brake pedal 210, and control the oil pressure supplied by the main master cylinder 300.

The oil pressure supplied by the main master cylinder 300 may be supplied from the third chamber through the third valve 630 to the first flow path unit 710, and supplied from the fourth chamber through the fourth valve 640 to the second flow path unit 720.

Thus, as the driver steps on the brake pedal 210, the first to fourth wheel cylinders 810 to 840 may be operated to generate braking forces for the respective wheels of the vehicle.

Figure 3:
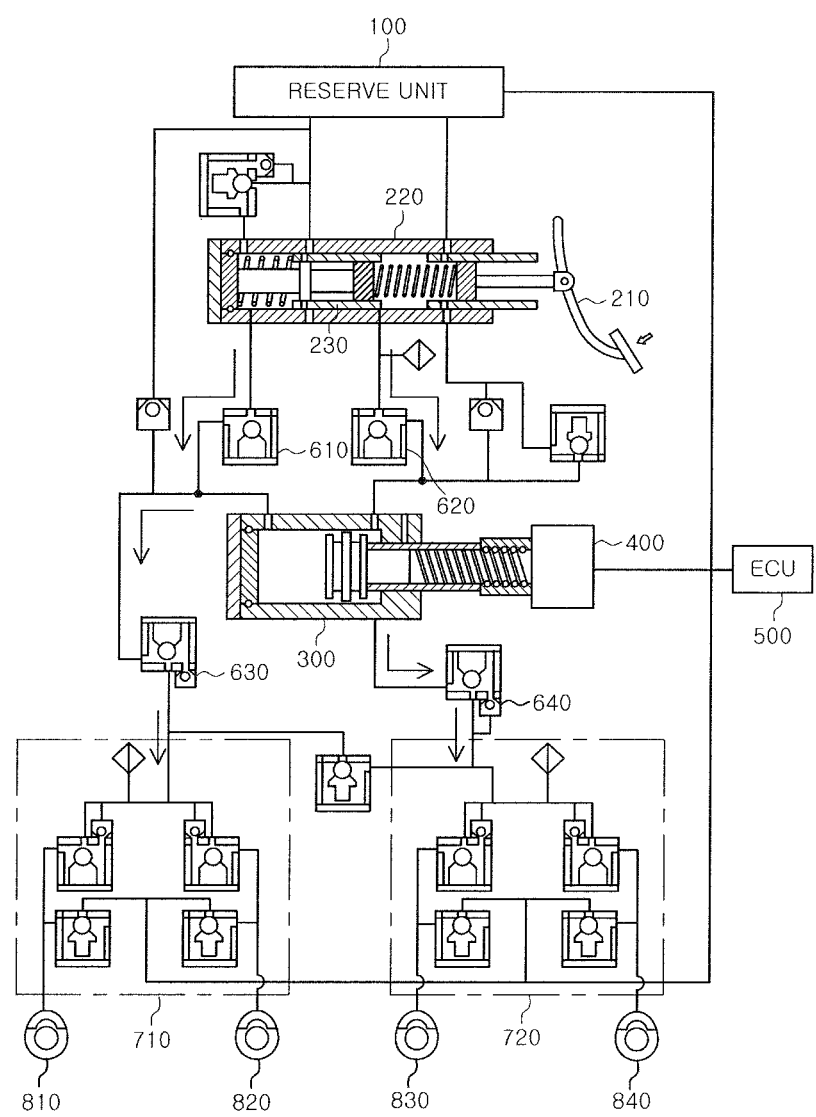
FIG. 3 is a diagram schematically illustrating a flow of oil pressure when no power is supplied to the ECU in the electronic hydraulic brake system in accordance with the embodiment of the present invention.

FIG. 3 is a diagram schematically illustrating a flow of oil pressure when no power is supplied to the ECU 500 in the electronic hydraulic brake system in accordance with the embodiment of the present invention.

When no power is supplied to the ECU 500, the operation of the electronic hydraulic brake system in accordance with the embodiment of the present invention will be described with reference to FIG. 3.

As described above, the first to fourth valves 610 to 640 may include normal open valves.

When no power is supplied to the ECU 500, no input is applied to the first and second valves 610 and 620. Thus, the valves may be opened to form flow paths.

Thus, between the first chamber of the backup master cylinder 220 and the third chamber of the main master cylinder 300, a flow path may be formed through the first valve 610, and between the third chamber of the backup master cylinder 220 and the fourth chamber of the main master cylinder 300, a flow path may be formed through the second valve 620.

Thus, although the ECU 500 and the motor 400 are not operated, the oil pressure generated by the oil supplied from the reserve unit 100 may be provided to the main master cylinder through the first and second valves 610 and 620 according to the driver's operation for the brake pedal 210.

Furthermore, since the third and fourth valves 630 and 640 are normal open valves, the third and fourth valves 630 and 640 may be opened to form flow paths when oil is supplied to the main master cylinder 300 by the backup master cylinder 220.

Thus, the oil pressure supplied from the first chamber of the backup master cylinder 300 and the third chamber of the main master cylinder 300 may be transferred to the first flow path unit 710 through the third valve 630, and the oil pressure supplied from the second chamber of the backup master cylinder 300 and the fourth chamber of the main master cylinder 300 may be transferred to the third flow path unit 720 through the fourth valve 640.

Therefore, even when a failure occurs because no power is supplied to the ECU 500, the driver may brake the vehicle because the oil pressure is supplied to the respective wheel cylinders 810 to 840 according to the driver's operation for the brake pedal 210.

In this case, since the oil pressure is supplied to the main master cylinder 300, a manual bleeding operation of removing air from the main master cylinder 300 may be performed without a separate device.

Furthermore, since both of the first and second flow path units 710 and 720 are connected to the reserve unit 100, a residual pressure does not occur in any one of the flow path units, even though the brake is continuously operated in a state where the ECU 500 is not operated.

In accordance with the embodiment of the present invention, the backup master cylinder connected to the brake pedal and the main master cylinder driven by the motor may be connected through the normal open valves, and the main master cylinder and the wheel brake may be connected through the normal open valves. Thus, although no power is applied to the ECU, the pedal pressure may be transferred to the main master cylinder. Thus, a manual bleeding operation may be performed even in a state where power is cut off for an after service of the vehicle, and the number and size of parts may be decreased to reduce the weight and manufacturing cost of the vehicle.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An electronic hydraulic brake system, comprising:
   a master cylinder;
   a master piston movably engaged with the master cylinder;
   a piston driving mechanism configured to move the master piston relative to the master cylinder, wherein the master cylinder and the master piston in combination define a master fluid compartment that is to generate a master oil pressure in response to operation of the piston driving mechanism;
   a pedal cylinder;
   a pedal piston movably engaged with the pedal cylinder and connected to a brake pedal, wherein the pedal cylinder and the pedal piston in combination define a pedal fluid compartment that is to generate a pedal oil pressure in response to movement of the brake pedal;
   a controller configured to generate control signals for controlling the piston driving mechanism in accordance with movement of the brake pedal;
   a plurality of wheel cylinders configured to provide a braking force to be applied to wheels, the plurality of wheel cylinders comprising a first wheel cylinder;
   a first fluid conduit connecting between a port of the pedal fluid compartment and a branching point with at least one valve therebetween;
   a second fluid conduit connecting between the branching point and the first wheel cylinder; and
   a third fluid conduit connecting between the branching point and a port of the master fluid compartment,
   wherein when the controller is operating and generates control signals for controlling the piston driving mechanism, the system is configured to close the at least one valve provided in the first fluid conduit and to form a fluid communication from the port of the master fluid compartment to the first wheel cylinder via the third fluid conduit and the second fluid conduit such that the master oil pressure generated at the master fluid compartment is transferred to the first wheel cylinder via the third fluid conduit and the second fluid conduit,
   wherein when the controller is not powered and does not generate control signals for controlling the piston driving mechanism, the system is configured to open the at least one valve and to form a fluid communication from the port of the pedal fluid compartment to the first wheel cylinder via the first fluid conduit and the second fluid conduit and further to form a fluid communication from the port of the pedal fluid compartment to port of the master fluid compartment via the first fluid conduit and the third fluid conduit such that the pedal oil pressure generated at the pedal fluid compartment is transferred to the master fluid compartment via the first fluid conduit and the third fluid conduit, whereby bleeding from the master cylinder is possible by movement of brake pedal without use of a bleeding device.

2. The electronic hydraulic brake system of claim 1, wherein the system is configured to maintain the at least one valve open except when the controller is operating and generates control signals for controlling the piston driving mechanism.

3. The electronic hydraulic brake system of claim 1, wherein the second connects between the branching point and the first wheel cylinder with at least one additional valve which is open when the pedal oil pressure generated at the pedal fluid compartment is transferred to the master fluid compartment.

4. The electronic hydraulic brake system of claim 1, wherein the plurality of wheel cylinders further comprises a second wheel cylinder and the second fluid conduit further connects between the branching point and the second wheel cylinder, wherein the first wheel cylinder is configured to brake a left front wheel among the wheels and the second wheel cylinder is configured to brake a right rear wheel among the wheels.

5. The electronic hydraulic brake system of claim 1, wherein the plurality of wheel cylinders further comprises a second wheel cylinder and the second fluid conduit further connects between the branching point and the second wheel cylinder, wherein the first wheel cylinder is configured to brake a left rear wheel among the wheels and the second wheel cylinder is configured to brake a right rear wheel among the wheels.

* * * * *